(12) United States Patent
Chen et al.

(10) Patent No.: US 10,620,502 B2
(45) Date of Patent: Apr. 14, 2020

(54) LIQUID CRYSTAL LENS, METHOD OF CONTROLLING THE SAME AND LIQUID CRYSTAL GLASSES

(71) Applicant: BOE Technology Group Co., Ltd., Beijing (CN)

(72) Inventors: ChenYu Chen, Beijing (CN); Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/129,754

(22) Filed: Sep. 12, 2018

(65) Prior Publication Data

US 2019/0302567 A1 Oct. 3, 2019

(30) Foreign Application Priority Data

Mar. 30, 2018 (CN) .......................... 2018 1 0292677

(51) Int. Cl.
*G02F 1/1335* (2006.01)
*G02F 1/29* (2006.01)
*G02C 7/08* (2006.01)

(52) U.S. Cl.
CPC .............. *G02F 1/29* (2013.01); *G02C 7/083* (2013.01); *G02F 1/133526* (2013.01); *G02F 2001/294* (2013.01); *G02F 2201/122* (2013.01)

(58) Field of Classification Search
CPC .... G02F 1/29; G02F 1/134309; G02F 1/1335; G02F 1/133526; G02F 1/133512; G02F 1/1343; G02F 1/13439; G02F 1/13; G02F 1/133504; G02F 2001/294; G02F 2201/122; G02B 27/0172; G02B 27/017; G02B 27/0176; G02B 27/0025; G02B 27/0955; G02B 3/14; G02B 3/0006; G02B 3/08; G02B 3/0062; G02B 3/10; G02B 5/1876; G02G 2027/0178; G02G 2027/011; G09G 2300/0426; G09G 3/36; G02C 7/04; G02C 7/049; G02C 7/041; G02C 7/083; G02C 7/06; G02C 7/061; G02C 2202/16; G02C 2202/20; H01L 51/5275

See application file for complete search history.

(56) References Cited

U.S. PATENT DOCUMENTS 9,470,937 B2 * 10/2016 Li ............................. G02F 1/29
2010/0245743 A1 * 9/2010 Yokoyama ............... G02B 3/08
349/117

* cited by examiner

*Primary Examiner* — Thoi V Duong
(74) *Attorney, Agent, or Firm* — McDermott Will & Emery LLP

(57) ABSTRACT

A liquid crystal lens, a method of controlling a liquid crystal lens and liquid crystal glasses are provided. The liquid crystal lens includes a liquid crystal layer; and an electrode structure. The electrode structure includes: a first sector region; a second sector region; at least two first annular sector electrodes in the first sector region; and at least two second annular sector electrodes in the second sector region. The electrode structure is configured to: in response to voltages applied to the at least two first annular sector electrodes, configure the liquid crystal molecules as a first Fresnel element; and in response to voltages applied to the at least two second annular sector electrodes, configure the liquid crystal molecules as a second Fresnel element, the second Fresnel element being different from the first Fresnel element.

17 Claims, 12 Drawing Sheets

Controlling voltages applied to at least two first annular sector electrodes in a first sector region to control liquid crystal molecules in a liquid crystal layer corresponding to the first sector region to produce a first deflection, so as to configure the liquid crystal molecules in the liquid crystal layer corresponding to the first sector region as a first Fresnel element

Controlling voltages applied to at least two second annular sector electrodes in a second sector region to control liquid crystal molecules in the liquid crystal layer corresponding to the second sector region to produce a second deflection, so as to configure the liquid crystal molecules in the liquid crystal layer corresponding to the second sector region as a second Fresnel element

FIG. 13

LIQUID CRYSTAL LENS, METHOD OF CONTROLLING THE SAME AND LIQUID CRYSTAL GLASSES

CROSS-REFERENCE TO RELATED APPLICATION

This application claims the benefit of Chinese Patent Application No. 201810292677.5 filed on Mar. 30, 2018 in the State Intellectual Property Office of China, the whole disclosure of which is incorporated herein by reference.

TECHNICAL FIELD

The present disclosure relates to the field of liquid crystal devices, and in particular, to a liquid crystal lens, a method of controlling a liquid crystal lens, and liquid crystal glasses.

BACKGROUND

Liquid crystal glasses have appeared on the current glasses market. Existing liquid crystal glasses have an adjustable focal length, but they cannot compensate for astigmatism at a specific position.

SUMMARY

In an aspect, it is provided a liquid crystal lens which may include: a liquid crystal layer; and an electrode structure, the electrode structure may include: a first sector region; a second sector region; at least two first annular sector electrodes in the first sector region; and at least two second annular sector electrodes in the second sector region, wherein the electrode structure is configured to: in response to voltages applied to the at least two first annular sector electrodes, control liquid crystal molecules in the liquid crystal layer corresponding to the first sector region to generate a first deflection so as to configure the liquid crystal molecules in the liquid crystal layer corresponding to the first sector region as a first Fresnel element; and in response to voltages applied to the at least two second annular sector electrodes, control liquid crystal molecules in the liquid crystal layer corresponding to the second sector region to generate a second deflection so as to configure the liquid crystal molecules in the liquid crystal layer corresponding to the second sector region as a second Fresnel element, the second Fresnel element being different from the first Fresnel element.

Optionally, the first Fresnel element has a first focal length, the second Fresnel element has a second focal length, and the first focal length is smaller than the second focal length.

Optionally, the first Fresnel element includes M units, each of the M units may include a light-transmissive annulus and an opaque annulus, and the second Fresnel element includes N units, each of the N units may include a light-transmissive annulus and an opaque annulus, wherein M and N are natural numbers and M is greater than N.

Optionally, quantity of the first annular sector electrodes is greater than quantity of the second annular sector electrodes.

Optionally, quantity of the first annular sector electrodes is equal to quantity of the second annular sector electrodes.

Optionally, the at least two first annular sector electrodes are arranged concentrically in the first sector region in a radial direction of the first sector region; and/or the at least two second annular sector electrodes are arranged concentrically in the second sector region in a radial direction of the second sector region.

Optionally, a distribution density of the at least two first annular sector electrodes in the radial direction of the first sector region is greater than a distribution density of the at least two second annular sector electrodes in the radial direction of the second sector region.

Optionally, widths of the at least two first annular sector electrodes in the radial direction of the first sector region gradually decrease in a radially outward direction of the first sector region; and/or widths of the at least two second annular sector electrodes in the radial direction of the second sector region gradually decrease in a radially outward direction of the second sector region.

Optionally, the electrode structure includes at least two first sector regions.

Optionally, the electrode structure includes at least two second sector regions.

Optionally, the electrode structure includes at least six second sector regions.

Optionally, the at least two first annular sector electrodes are arranged in two layers respectively, and any two adjacent ones of the at least two first annular sector electrodes are alternately arranged in the two layers; and/or the at least two second annular sector electrodes are arranged in two layers respectively, and any two adjacent ones of the at least two second annular sector electrodes are alternately arranged in the two layers.

Optionally, each of the first Fresnel element and the second Fresnel element has an equivalent optical path length, the equivalent optical path length having two levels, four levels, six levels or eight levels.

Optionally, the liquid crystal lens may further include: a first substrate and a second substrate opposite to each other; and a common electrode, wherein the liquid crystal layer is disposed between the first substrate and the second substrate, the electrode structure is disposed on a side of the first substrate facing towards the liquid crystal layer, and the common electrode is disposed on a side of the second substrate facing towards the liquid crystal layer.

Optionally, the common electrode includes a planar electrode.

In another aspect, it is provided a method of controlling a liquid crystal lens, the liquid crystal lens may include a liquid crystal layer and an electrode structure, the electrode structure may include: a first sector region; a second sector region; at least two first annular sector electrodes in the first sector region; and at least two second annular sector electrodes in the second sector region, the control method may include:

controlling voltages applied to the at least two first annular sector electrodes to control liquid crystal molecules in the liquid crystal layer corresponding to the first sector region to produce a first deflection, so as to configure the liquid crystal molecules in the liquid crystal layer corresponding to the first sector region as a first Fresnel element; and controlling voltages applied to the at least two second annular sector electrodes to control liquid crystal molecules in the liquid crystal layer corresponding to the second sector region to produce a second deflection, so as to configure the liquid crystal molecules in the liquid crystal layer corresponding to the second sector region as a second Fresnel element, wherein the second Fresnel element is different from the first Fresnel element.

Optionally, the first Fresnel element has a first focal length, the second Fresnel element has a second focal length, and the first focal length is smaller than the second focal length.

Optionally, the first Fresnel element includes M units, each of the M units may include a light-transmissive annulus and an opaque annulus, and the second Fresnel element includes N units, each of the N units may include a light-transmissive annulus and an opaque annulus, wherein M and N are natural numbers and M is greater than N.

In a further aspect, it is provided liquid crystal glasses which may include: a frame; and two liquid crystal lenses on the frame, wherein at least one of the two liquid crystal lenses is the liquid crystal lens as mentioned above.

BRIEF DESCRIPTION OF THE DRAWINGS

FIG. 13 is a flowchart of a method of controlling a liquid crystal lens according to an embodiment of the present disclosure.

DETAILED DESCRIPTION OF EMBODIMENTS

Figure 1:
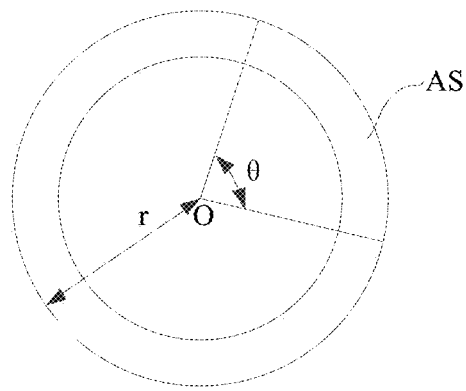
FIG. 1 is a schematic view schematically showing a sector region and an annular sector.

Technical solutions of the present disclosure will be further specifically described below by way of embodiments with reference to accompanying drawings. In the descriptions, the same or similar reference numerals indicate the same or similar parts. The descriptions of the embodiments of the present disclosure with reference to accompanying drawings are intended to be illustrative of a general concept of the present disclosure, and are not to be construed as limiting the present disclosure.

In addition, in the following detailed descriptions, numerous specific details are set forth to provide a thorough understanding of the embodiments of the present disclosure for purpose of explanation. Obviously, however, one or more embodiments may be practiced without these specific details. In other instances, well-known structures and devices are schematically shown in the drawings to simplify the drawings.

In the context, the expression "sector" (also called as circular sector) refers to a graph which is enclosed by an arc and two radii passing through two ends of the arc respectively. As shown in FIG. 1, the sector is a portion of a circle, and it has a center O, a radius r and a central angle θ. The expression "sector region" refers to a region having a sector shape. The expression "annular sector" refers to a portion of an annulus intersecting with a sector, as indicated by AS in FIG. 1, the annular sector also having a center O, a radius r and a central angle θ.

Figure 2:
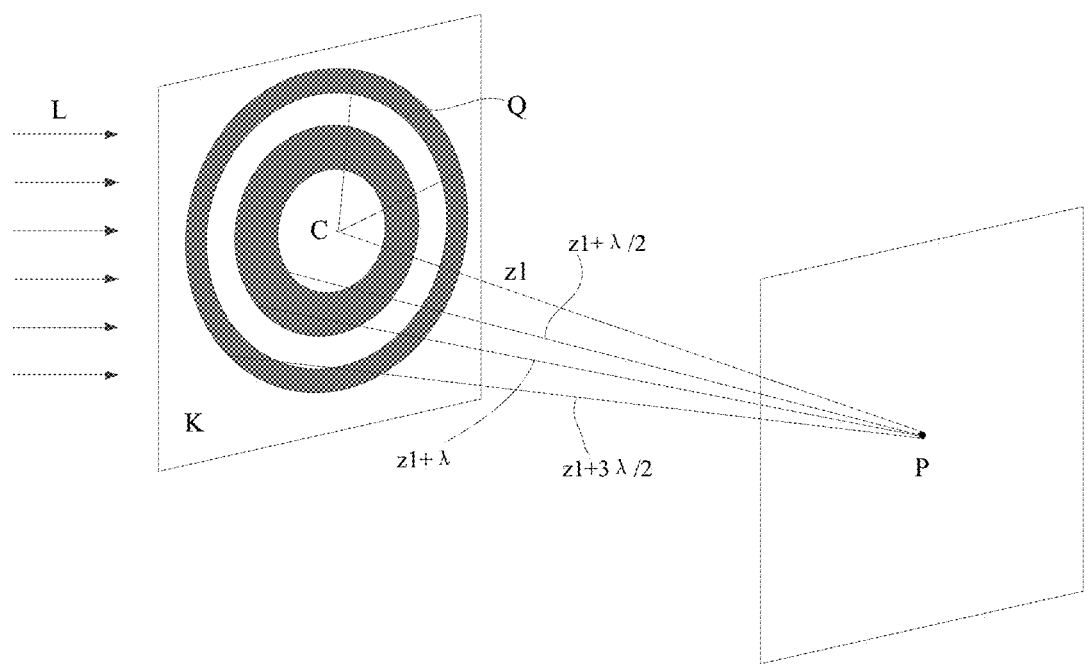
FIG. 2 is a schematic view schematically showing the principle of a Fresnel zone plate.

As shown in FIG. 2, if light emitted from a point P is received by an observation screen K under an action of diffraction effect, there will be an intensity distribution in form of a plurality of concentric annuli, which include bright annuli and dark annuli arranged alternately, on the observation screen K. The plurality of concentric annuli expand outward sequentially. A distance between the center C and the point P is z1, and distances between outer circles of the plurality of concentric annuli and the point P are sequentially $z1+\lambda/2$, $z1+\lambda$, $z1+3\lambda/2$, . . . . According to the reversibility principle of optical path, if the plurality of concentric annuli which include bright annuli and dark annuli arranged alternately are used as an optical element, the light beams L may be concentrated at the point P, that is, the focusing function of the lens is realized. Such an optical element that allows only odd-numbered annuli (or even-numbered annuli) to transmit light is referred to as a Fresnel zone plate. As shown in FIG. 2, in the context, a portion of the Fresnel zone plate (for example, the sector portion Q) may be referred to as a Fresnel sector, and the Fresnel zone plate or the Fresnel sector may have a light-transmissive annulus (also referred to as transparent annulus) and an opaque annulus. In the context, each of the light-transmissive annulus (also referred to as transparent annulus) and the opaque annulus of the Fresnel zone plate or the Fresnel sector may be referred to as the Fresnel annulus. In an example, light may be allowed to transmit through the odd-numbered annuli while light may not be allowed to transmit through the even-numbered annuli, so that each of the odd-numbered annuli may be referred to as the light-transmissive annulus while each of the even-numbered annuli may be referred to as the opaque annulus. In other examples, each of the odd-numbered annuli may correspond to the opaque annulus while each of the even-numbered annuli may correspond to the light-transmissive annulus.

It should be noted that, in the context, the Fresnel zone plate or a portion of the Fresnel zone plate, for example, the Fresnel sector Q shown in FIG. 2, may be referred to as a Fresnel element. It should be understood that the Fresnel element has parameters which are defined with reference to the Fresnel zone plate, such as focal length and the like.

Figure 3:
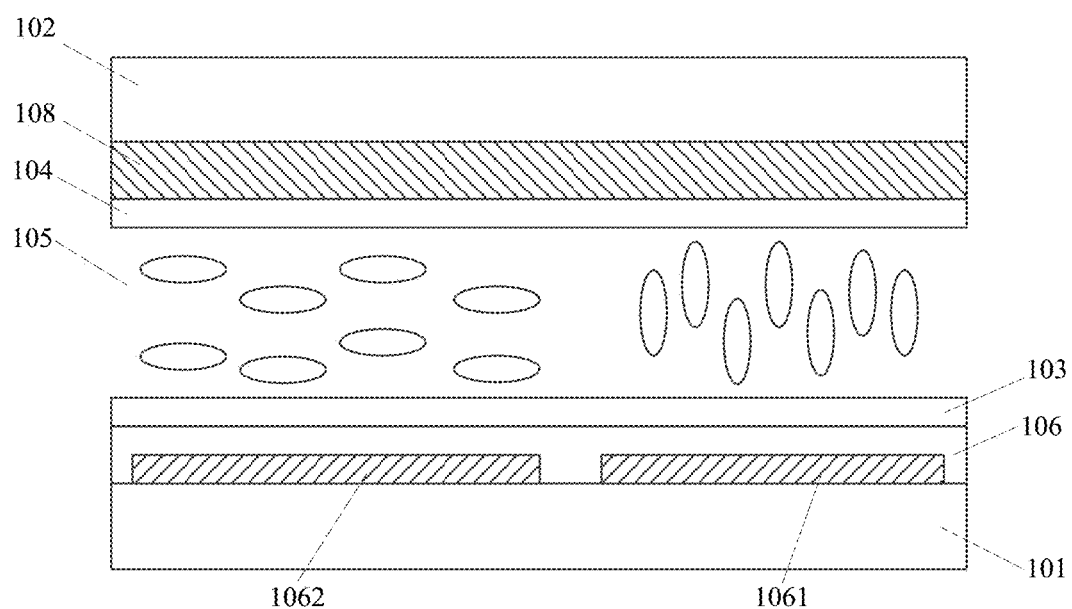
FIG. 3 is a schematic cross-sectional view of a liquid crystal device according to an embodiment of the present disclosure.

Liquid crystal is a material having strong optical anisotropy and dielectric anisotropy, and the properties of the liquid crystal may be utilized to form a Fresnel zone plate. As shown in FIG. 3, a liquid crystal device according to an embodiment of the present disclosure is illustrated. The liquid crystal device includes: a first substrate 101 and a second substrate 102 disposed opposite to each other; a first alignment layer 103 disposed on the first substrate 101; a second alignment layer 104 disposed on the second substrate 102; a liquid crystal layer 105 disposed between the first alignment layer 103 and the second alignment layer 104; an electrode structure 106 disposed on a side of the first substrate 101 facing towards the liquid crystal layer 105; and a common electrode 108 disposed on a side of the second substrate 102 facing towards the liquid crystal layer 105. For example, the electrode structure 106 may include a plurality of pixel electrodes 1061, 1062, and the pixel electrodes 1061, 1062 each are annular electrode. The common electrode 108 may be a planar electrode. It should be understood that the first substrate 101 and the second substrate 102 may be assembled to form a liquid crystal cell.

For example, when a predetermined voltage is applied to the pixel electrode 1061 on the right side in the liquid crystal cell, liquid crystal molecules corresponding to the pixel electrode 1061 (i.e., liquid crystal molecules on the right side in FIG. 3) may be oriented in a direction of an electric field. When linearly polarized light is incident into the liquid crystal cell, an effective refractive index of liquid crystal molecules on the left side in the liquid crystal cell (i.e., the liquid crystal molecules corresponding to the pixel electrode 1062) is labeled as refractive index ne, and an effective refractive index of liquid crystal molecules on the right side in the liquid crystal cell is labeled as refractive index no. At this time, after the linearly polarized light passes through the left-side portion and the right-side portion of the liquid crystal cell, a phase difference will be generated. The phase difference may be calculated by the following formula (1):

$$s = \frac{2\pi}{\lambda}(n_e - n_o)d \quad (1)$$

where s is the phase difference, λ is the wavelength of the incident light, and d is a thickness of the liquid crystal cell.

If s is odd multiples of π, that is, s=(2i+1)π, where i is a natural number; and each of the pixel electrodes of the pixel structure 106 is an annular electrode, then by controlling voltages applied to the pixel electrodes, the left-side portion and the right-side portion of the liquid crystal cell may be formed into the odd-numbered annulus and the even-numbered annulus of the Fresnel zone plate adjacent to each other, respectively. As a result, a Fresnel zone plate as shown in FIG. 2 may be obtained.

Figure 4:
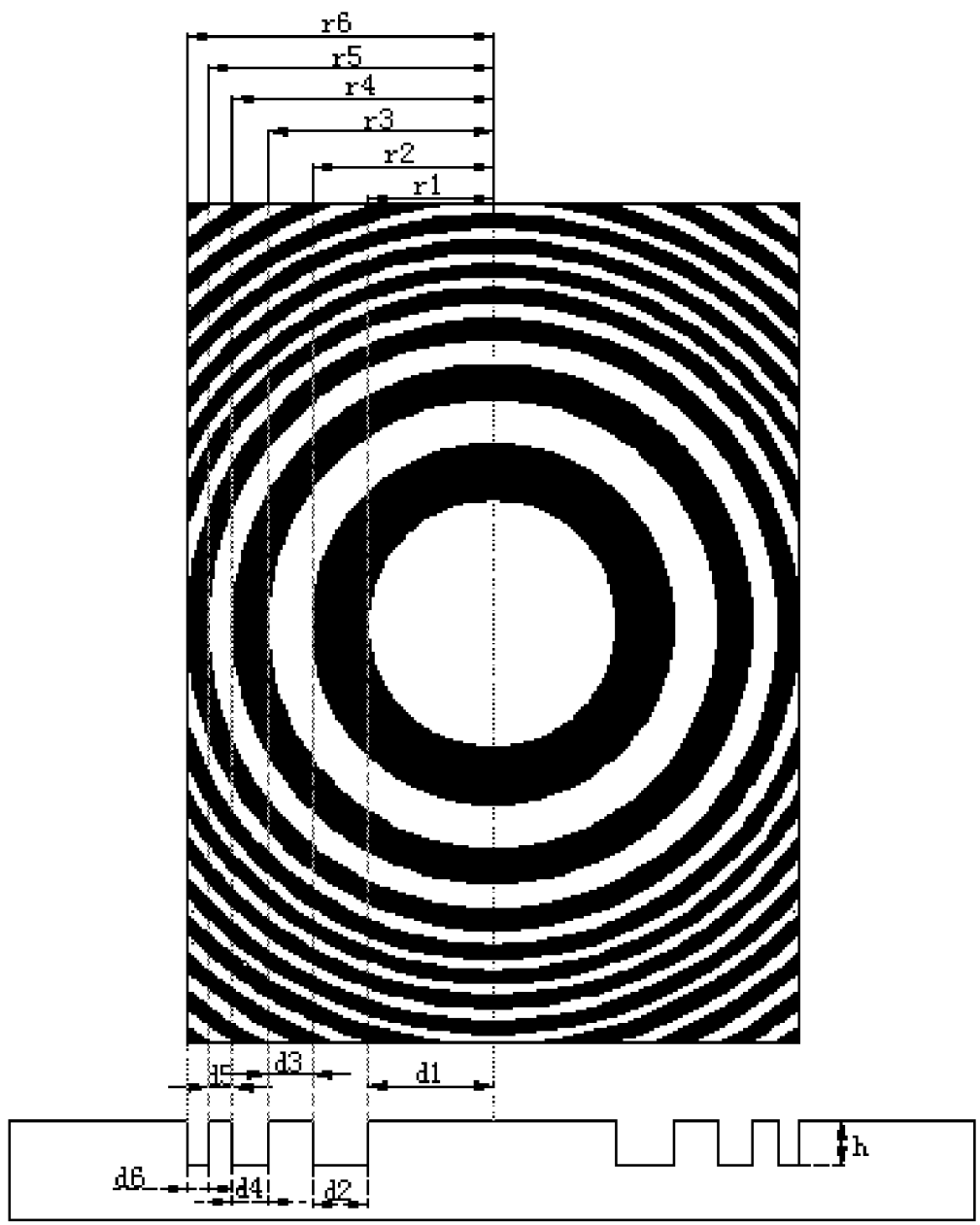
FIG. 4 is a schematic view of a liquid crystal Fresnel zone plate and its equivalent optical path length according to an embodiment of the present disclosure.

FIG. 4 is a schematic equivalent view of a Fresnel zone plate according to an embodiment of the present disclosure. Referring to the above descriptions with regard to FIG. 3, the basic principle of the liquid crystal Fresnel zone plate is to adopt the Fresnel zone plate optical design concept and to control arrangement states (e.g., deflection states) of the liquid crystal molecules by different voltages applied to the respective annular electrodes to obtain different effective refractive indices of the liquid crystal molecules, thereby obtaining a multi-level distribution of the equivalent optical path length. As shown in the upper part of FIG. 4, the Fresnel zone plate consists of the light-transmissive annuli and the opaque annuli arranged alternately. The Fresnel zone plate may be fabricated by a phase compensation method such that the fabricated Fresnel zone plate has an equivalent optical path length with a multi-level distribution. As an example, the lower part of FIG. 4 shows a multi-level distribution of two levels. In other embodiments, a multi-level distribution of four levels, six levels or eight levels may be employed in order to improve the light efficiency.

Taking the multi-level distribution of two levels shown in the lower part of FIG. 4 as an example, inner radii $r_1$, $r_2 \ldots r_j$ of the annuli (including the light-transmissive annuli and the opaque annuli) and widths $d_1$, $d_2 \ldots d_j$ of the annular electrodes may be respectively obtained by the following formulas (2), (3) and (4):

$$r_j = \sqrt{j * f * \lambda} \quad (2)$$

$$d_1 = \sqrt{f * \lambda} \quad (3)$$

$$d_j = r_j - r_{j-1} \quad (4)$$

where j is quantity of annuli which are alternately arranged in a radially outward direction, f is the focal length of the Fresnel zone plate, and λ is the wavelength of the incident light.

In FIG. 4, h is a height of the level of the equivalent optical path length, that is, the optical path length of the liquid crystal layer. In an embodiment of the present disclosure, h=n*d wherein d is the thickness of the liquid crystal cell and n is the effective refractive index of the liquid crystal molecules.

In the liquid crystal device according to the embodiment of the present disclosure, by applying different voltages to the respective annular pixel electrodes of the electrode structure, liquid crystal molecules in regions of the liquid crystal layer corresponding to the respective annular pixel electrodes are controlled to produce different deflections, thereby obtaining different effective refractive indices for the liquid crystal molecules, and thus producing different equivalent levels.

Figure 5:
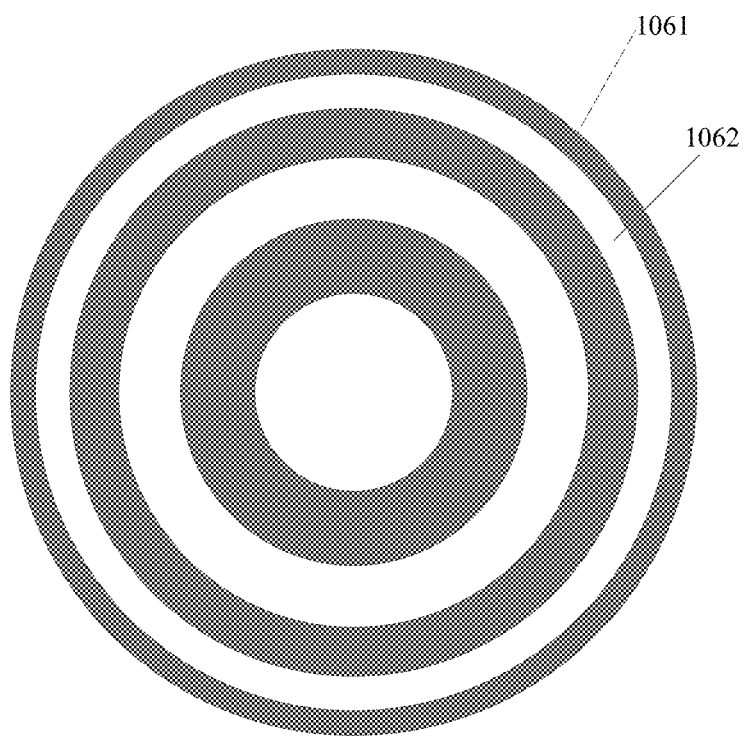
FIG. 5 is a schematic view schematically showing an electrode structure of the liquid crystal device of FIG. 3.

Therefore, as shown in the upper part of FIG. 4, for the alternately arranged light-transmissive and opaque annuli of the Fresnel zone plate, the inner radii $r_1$, $r_2 \ldots r_j$ of the annuli gradually increase in a radially outward direction while the widths of the annuli gradually decrease in the radially outward direction. Correspondingly, as shown in the lower part of FIG. 4, the widths $d_1$, $d_2 \ldots d_j$ of the annular electrodes of the electrode structure corresponding to the widths of the annuli gradually decrease so that the electrode structure has an equivalent annular arrangement to the Fresnel zone plate. For example, FIG. 5 is a schematic structural view of an electrode structure in a liquid crystal device according to an embodiment of the present disclosure, and may also be regarded as an optical effect diagram of an equivalent Fresnel zone plate obtained by the electrode structure. As shown in FIG. 5, the electrodes 1061, 1062 of the electrode structure are arranged to achieve an equivalent optical path length of two levels. In particular, the opaque (black) annuli correspond to high-level portions and the transparent (white) annuli correspond to low-level portions, and a black annulus and a white annulus together constitute one diffraction unit of the Fresnel zone plate with two levels.

Figure 6:
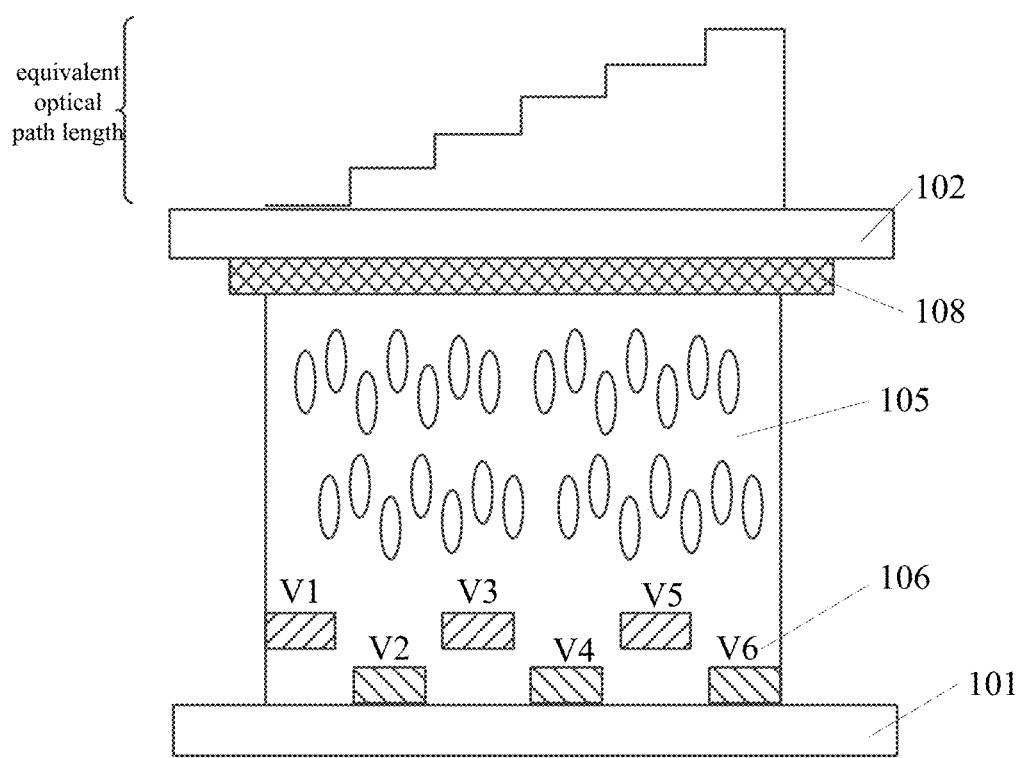
FIG. 6 is a schematic view of an equivalent optical path length of a liquid crystal Fresnel zone plate according to an embodiment of the present disclosure.

Alternatively, in order to improve the light efficiency, an equivalent optical path length of four levels, six levels or eight levels may also be obtained. FIG. 6 is a schematic view of an equivalent optical path length of a liquid crystal Fresnel zone plate according to an embodiment of the present disclosure. In the embodiment illustrated in FIG. 6, the liquid crystal cell includes substrates 101, 102 and a liquid crystal layer 105 sandwiched between the substrate 101 and the substrate 102. An electrode structure 106, which may serve as a pixel electrode, is disposed on a side of the substrate 101 facing towards the liquid crystal layer 105. A common electrode 108 is disposed on a side of the substrate 102 facing towards the liquid crystal layer 105. Various electrodes of the electrode structure 106 are applied to voltages to control liquid crystal molecules in the liquid crystal layer 105 to produce different deflections, thereby achieving an equivalent optical path length of six levels. As shown, six voltages V1~V6 are respectively applied to the pixel electrodes arranged on upper and lower layers. The six voltages are configured to respectively control the liquid crystal molecules in the liquid crystal cell to produce different deflections, so that the effective refractive indices of the liquid crystal molecules are distributed at different refractive indices $n_1$~$n_6$. In the case, the voltages applied to the pixel electrodes are controlled such that the effective refractive indices $n_1$~$n_6$ of the liquid crystal molecules satisfy the following formula:

$$(n_{i+1}-n_i)*d=\tfrac{1}{6}*\lambda \tag{5}$$

where i is the natural number which is equal to or greater than 1 and less than or equal to 5, $n_{i+1}$, $n_i$ are respectively the effective refractive indices required for the liquid crystal molecules corresponding to i th electrode and $(i+1)^{th}$ electrode, d is the thickness of the liquid crystal cell, and $\lambda$ is the wavelength of the incident light.

In an embodiment of the present disclosure, the liquid crystal device may be a liquid crystal lens. Referring to FIG. 3, the liquid crystal lens according to an embodiment of the present disclosure may include: a first substrate 101 and a second substrate 102 disposed opposite to each other; a first alignment layer 103 disposed on the first substrate 101; a second alignment layer 104 disposed on the second substrate 102; a liquid crystal layer 105 disposed between the first alignment layer 103 and the second alignment layer 104; an electrode structure 106 disposed on a side of the first substrate 101 facing towards the liquid crystal layer 105; and a common electrode 108 disposed on a side of the second substrate 102 facing towards the liquid crystal layer 105. For example, the electrode structure 106 may include a plurality of pixel electrodes 1061, 1062. It should be understood that the first substrate 101 and the second substrate 102 may be assembled to form a liquid crystal cell.

Specifically, the electrode structure 106 may be configured to control liquid crystal molecules in regions of the liquid crystal layer 105 corresponding to electrodes of the electrode structure 106 to produce different deflections in response to different voltages applied to the electrodes of the electrode structure 106 at different positions, so as to obtain different effective refractive indices.

For example, referring to FIG. 5, each of the electrodes of the electrode structure 106 may be an annular electrode. The electrodes of the electrode structure 106 at different positions may be arranged to control the liquid crystal molecules in the regions of the liquid crystal layer 105 corresponding to the electrodes of the electrode structure 106 to produce different deflections such that the liquid crystal molecules in the liquid crystal layer 105 are equivalent to the Fresnel zone plate with adjustable focal length under the action of the electrodes.

When it detects that the wearer is nearsighted or farsighted, the focal length f of the required equivalent Fresnel zone plate may be calculated according to the wearer's myopia diopter or hyperopia diopter, then the inner radii and the widths of the annular electrodes of the electrode structure of the liquid crystal lens may be respectively obtained according to the above formulas (2), (3) and (4). For example, if it detects that the wearer's myopia diopter (also referred to as negative diopter) is D1, then the focal length f of the required equivalent Fresnel zone plate may be calculated according to the formula f=100/D1. Then, by substituting the calculated value of the focal length f into the above formulas (2), (3), and (4) respectively, the inner radii and the widths of the annular electrodes of the electrode structure of the liquid crystal lens may be obtained respectively. In this way, the focal length of the lens may be flexibly adjusted according to the wearer's myopia diopter. Moreover, in the liquid crystal lens according to the embodiment of the present disclosure, the liquid crystal lens may be equivalent to the Fresnel zone plate by controlling the liquid crystal by the electrodes so that it is advantageous for achieving lightness and thinness of the device.

Figure 7:
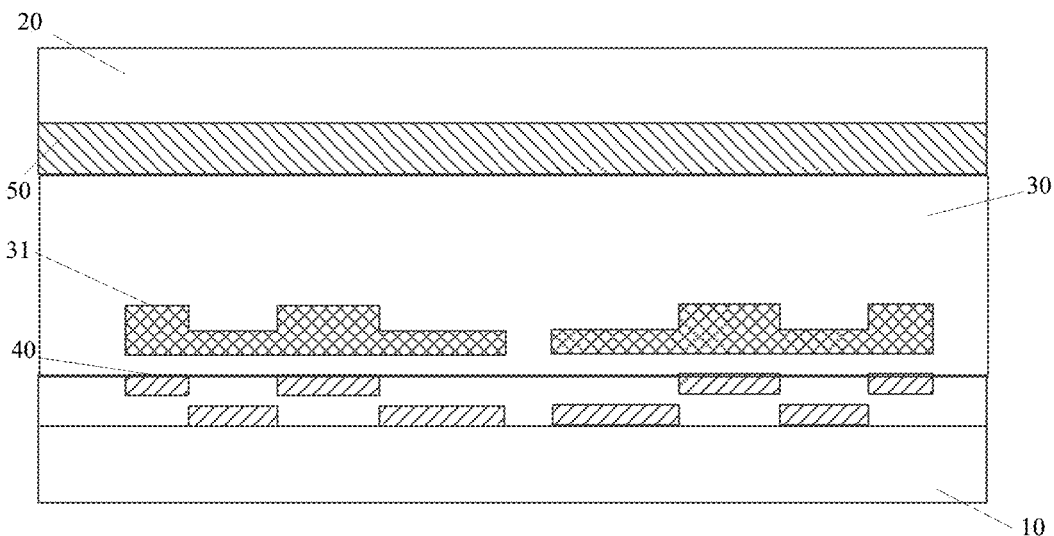
FIG. 7 is a schematic cross-sectional view of a liquid crystal lens according to an embodiment of the present disclosure, showing an ordinary region of the liquid crystal lens.
Figure 8:
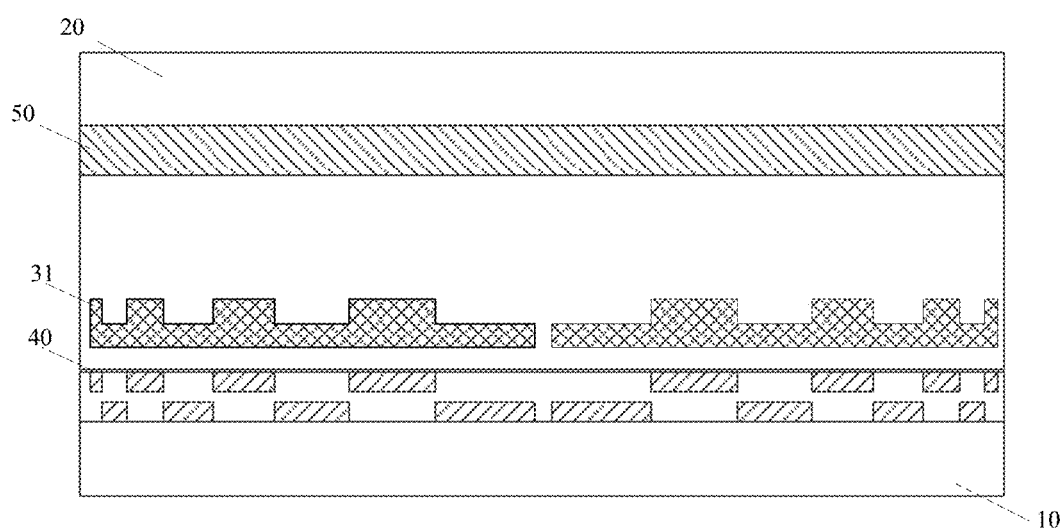
FIG. 8 is a schematic cross-sectional view of a liquid crystal lens according to an embodiment of the present disclosure, showing an astigmatic region of the liquid crystal lens.

Optionally, an embodiment of the present disclosure further provides a liquid crystal lens that may achieve astigmatism compensation. FIGS. 7 and 8 are schematic cross-sectional views of a liquid crystal lens according to an embodiment of the present disclosure, in particular, FIG. 7 shows a structure in an ordinary region of the liquid crystal lens and FIG. 8 shows a structure in an astigmatic region of the liquid crystal lens.

According to an embodiment of the present disclosure, as shown in FIGS. 7 and 8, a liquid crystal lens is provided, including: a first substrate 10 and a second substrate 20 disposed opposite to each other; a liquid crystal layer 30 disposed between the first substrate 10 and the second substrate 20; an electrode structure 40 disposed on a side of the first substrate 10 facing towards the liquid crystal layer 30; and an electrode structure 50 disposed on a side of the second substrate 20 facing towards the liquid crystal layer 30. For convenience of description, in FIGS. 7 and 8, the liquid crystal molecules 31 in the liquid crystal layer 30 are shown in the form of an equivalent optical path length.

It should be understood that some components (e.g., alignment layers, etc.) are not shown in the drawings in order to simplify the drawing, but the liquid crystal lens according to an embodiment of the present disclosure may include other components such as alignment layers.

For example, the electrode structure 40 may include a plurality of pixel electrodes, and the electrode structure 50 may include a common electrode.

According to an embodiment of the present disclosure, the electrode structure 40 may be configured to control the liquid crystal molecules 31 in regions of the liquid crystal layer 30 corresponding to the electrodes of the electrode structure 40 to produce different deflections when the electrodes of the electrode structure 40 at different positions are applied with different voltages, so as to obtain different effective refractive indices of the liquid crystal molecules 31.

For example, the electrodes of the electrode structure 40 may be arranged in annular shape, for example, each of the electrodes is an annular electrode. The electrodes of the electrode structure 40 at different positions may be arranged to control the liquid crystal molecules 31 in the regions of the liquid crystal layer 30 corresponding to the electrodes of the electrode structure 40 to produce different deflections such that the liquid crystal molecules 31 in the liquid crystal layer 30 are equivalent to the Fresnel zone plate with adjustable focal length under the action of the electrodes. Comparing FIG. 7 with FIG. 8, it can be seen that the quantity of the electrodes of the electrode structure 40 in the astigmatic region is larger than the quantity of the electrodes of the electrode structure 40 in the ordinary region, and arrangements of the respective electrodes will be described in detail below.

As an example, in the embodiment illustrated in FIGS. 7 and 8, the liquid crystal molecules 31 are controlled such that the equivalent Fresnel zone plates has a multi-level distribution with two levels. In other embodiments, the liquid crystal molecules 31 may be controlled such that the equivalent Fresnel zone plate has a multi-level distribution with four levels, six levels or eight levels.

Optionally, in an embodiment according to the present disclosure, the electrode structure 40 may include two or more sector regions, for example, it may be divided into two, four, six, or eight sector regions. As the quantity of the sector regions increases, the astigmatic diopter which is caused by focusing defect of a human eye at a specific optical axis position may be compensated more finely.

Figure 9A:
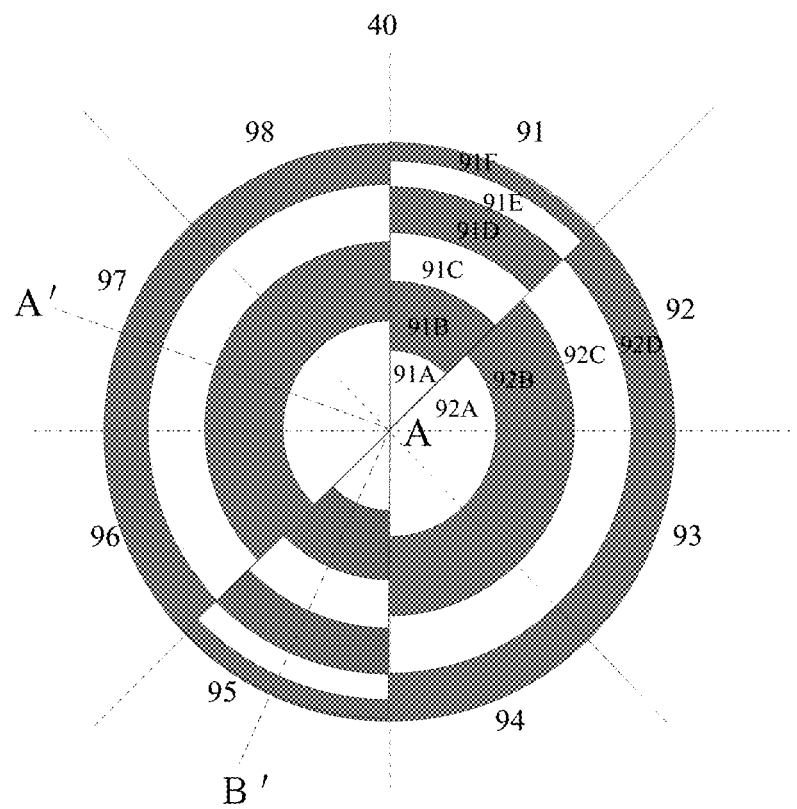
FIG. 9A is a schematic view of annular sector electrodes of a liquid crystal lens according to an embodiment of the present disclosure.

As an example, as shown in FIG. 9A, the electrode structure 40 may include sector regions 91~98. For example, as shown in FIG. 9A, six annular sector electrodes are disposed in the sector region 91 in a radially outward direction, and the six annular sector electrodes include an annular sector electrode 91A, an annular sector electrode 91B, an annular sector electrode 91C, an annular sector electrode 91D, an annular sector electrode 91E and an annular sector electrode 91F. Four annular sector electrodes are disposed in the sector region 92 in a radially outward direction, and the four annular sector electrodes include an annular sector electrode 92A, an annular sector electrode 92B, an annular sector electrode 92C and an annular sector electrode 92D. The sector region 95 has the same structure as the sector region 91, and the sector regions 93, 94, 96, 97, 98 have the same structure as the sector region 92.

For convenience of description, regions of the liquid crystal lens corresponding to the sector regions 91, 95 are referred to as the astigmatic regions and portions of the liquid crystal lens corresponding to the sector regions 92, 93, 94, 96, 97, 98 are referred to as the ordinary regions.

Similarly, the electrodes of the electrode structure 40 at different positions may be applied with voltages to control the liquid crystal molecules 31 in the regions of the liquid crystal layer 30 corresponding to the electrodes of the electrode structure 40 to produce different deflections such that the liquid crystal molecules 31 in the liquid crystal layer 30 are equivalent to the Fresnel zone plate with adjustable focal length under the action of the electrodes.

Figure 9B:
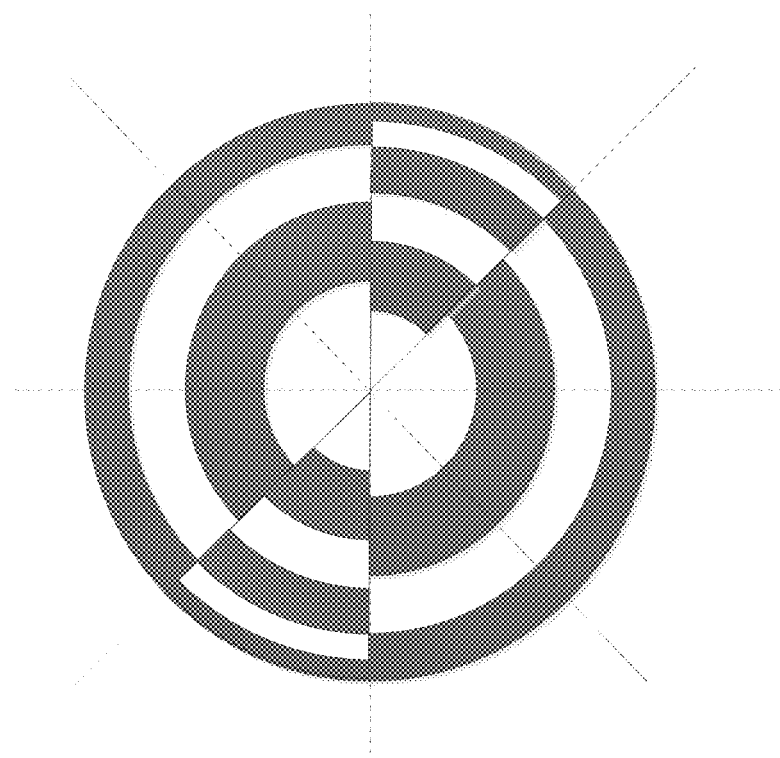
FIG. 9B is a schematic view of a Fresnel annulus caused by the annular sector electrodes of FIG. 9A.

FIG. 9B schematically shows an equivalent Fresnel zone plate. As shown in FIG. 9B, in response to the control of the six annular sector electrodes 91A~91E in the sector region 91, the liquid crystal molecules 31 corresponding to the respective electrodes in the sector region 91 are deflected, thereby forming three diffraction units in the astigmatic region. Each of the diffraction units includes an opaque annular sector and a transparent annular sector. In response to the control of the four annular sector electrodes 92A~92D in the sector region 92, the liquid crystal molecules 31 corresponding to the respective electrodes in the sector region 92 are deflected, thereby forming two diffraction units in the ordinary region. Each of the diffraction units includes an opaque annular sector and a transparent annular sector.

Specifically, when it detects that the wearer's eye is nearsighted/farsighted and astigmatic, the focal length f of the required equivalent Fresnel zone plate may be calculated according to the wearer's myopia/hyperopia diopter and astigmatic diopter, then the inner radii and the widths of the annular sector electrodes of the electrode structure of the liquid crystal lens are respectively obtained according to the above formulas (2), (3) and (4). For example, if it detects that the wearer's myopia diopter is D1 and the wearer's astigmatic diopter is D2, then the focal length f1 of the required equivalent Fresnel zone plate of the ordinary region of the lens may be calculated according to the formula f1=100/D1, and the focal length f2 of the required equivalent Fresnel zone plate of the astigmatic region of the lens may be calculated according to the formula f2=100/(D1+D2). Then, by substituting the calculated values of the focal lengths f1, f2 into the above formulas (2), (3), and (4), respectively, the inner radii and the widths of the annular sector electrodes of the ordinary region of the electrode structure of the liquid crystal lens may be obtained respectively, and the inner radii and the widths of the annular electrodes of the astigmatic region of the electrode structure of the liquid crystal lens may also be obtained respectively. Due to the astigmatic diopter, the focal length f2 of the equivalent Fresnel zone plate required for the astigmatic region is smaller than the focal length f1 of the equivalent Fresnel zone plate required for the ordinary region, according to the above formulas (2), (3) and (4), the inner radius and the width of each annular sector electrode of the astigmatic region are smaller than the inner radius and the width of the corresponding annular sector electrode of the ordinary region. In particular, the electrodes of the astigmatic region are more densely distributed than the electrodes of the ordinary region, as shown in FIG. 9A.

In an embodiment of the present disclosure, when it needs to compensate for astigmatism, the electrode structure 40 is controlled such that the quantity of annular sector electrodes, which are capable of deflecting liquid crystal molecules in regions of the liquid crystal layer corresponding to the annular sector electrodes, in at least one sector region is greater than the quantity of annular sector electrodes, which are capable of deflecting liquid crystal molecules in regions of the liquid crystal layer corresponding to the annular sector electrodes, in the other sector regions, so that the density of the Fresnel annuli caused by the annular sector electrodes in the at least one sector region is greater than the density of the Fresnel annuli caused by the annular sector electrodes in the other sector regions. In this way, the astigmatic diopter which is caused by focusing defect of the wearer's eye at a specific optical axis position may be compensated, so that the liquid crystal lens according to the embodiment of the present disclosure may correct the astigmatism. Here, the at least one sector region corresponds to the astigmatic region of the liquid crystal lens and the other sector regions correspond to the ordinary regions of the liquid crystal lens. Thus, when it detects that the wearer's eye has a astigmatic diopter at a specific optical axis position due to the focusing defect, a position of the astigmatic region of the liquid crystal lens may correspond to the specific optical axis position of the wearer's eye and positions of the ordinary regions may correspond to the other positions of the wearer's eye, so as to compensate for astigmatic diopter caused by the focusing defect of the wearer's eye at the optical axis position. Therefore, the liquid crystal lens according to the embodiment of the present disclosure may correct astigmatism.

Figure 10A:
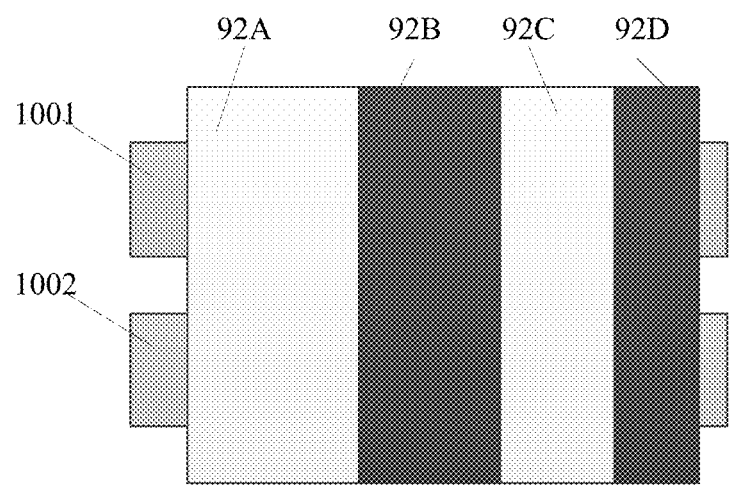
FIG. 10A is a schematic cross-sectional view of the electrode structure taken along line AA' in FIG. 9A.
Figure 10B:
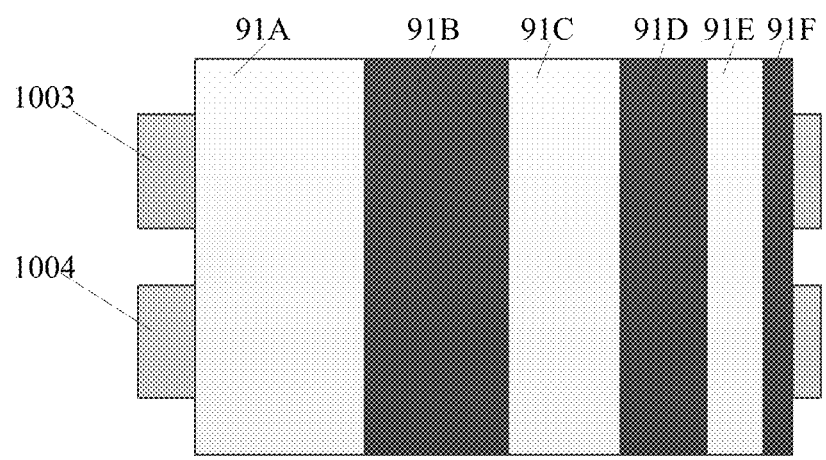
FIG. 10B is a schematic cross-sectional view of the electrode structure taken along line AB' in FIG. 9A.

For example, FIGS. 10A and 10B are schematic cross-sectional views of the electrode structure taken along line AA' and line AB' in FIG. 9A, respectively. As shown in FIG. 10A, conductive traces 1001, 1002 are electrically connected to the annular sector electrodes in the ordinary regions (e.g., the sector region 92). For example, the conductive trace 1001 may be electrically connected to the annular sector electrodes 92A, 92C in the ordinary region (e.g., the sector region 92) and the conductive trace 1002 may be electrically connected to the annular sector electrodes 92B, 92D in the ordinary region (e.g., the sector region 92), so as to control the annular sector electrodes 92A, 92C and the annular sector electrodes 92B, 92D, respectively, thereby producing the Fresnel annuli with alternating bright annuli and dark annuli in the ordinary regions. As shown in FIG. 10B, conductive traces 1003, 1004 are electrically connected to the annular sector electrodes in the astigmatic regions (e.g., the sector region 91). For example, the conductive trace 1003 may be electrically connected to the annular sector electrodes 91A, 91C, 91E in the astigmatic region (e.g., the sector region 91) and the conductive trace 1004 may be electrically connected to the annular sector electrodes 91B, 91D, 91E in the astigmatic region (e.g., the sector region 91), so as to control the annular sector electrodes 91A, 91C, 91E and the annular sector electrodes 91B, 91D, 91F, respectively, thereby producing the Fresnel annuli with alternating bright annuli and dark annuli in the astigmatic regions.

According to an embodiment of the present disclosure, in the above annular arrangement, the quantity of the annular sector electrodes in the at least one sector region may be larger than the quantity of the annular sector electrodes in each of the other sector regions. There are a plurality of annular sector electrodes in each sector region, and the plurality of annular sector electrodes in each sector region are distributed in a concentric and spaced manner. For example, in the above embodiment, as an example, the quantity of the annular sector electrodes disposed in the astigmatic region is 6, the quantity of the annular sector electrodes disposed in the ordinary region is 4, and the quantity of the annular sector electrodes disposed in the astigmatic region is larger than that in the ordinary region. The quantity of the annular sector electrodes described above should not be construed as limiting the embodiments of the present disclosure, and in other embodiments, other quantity of the annular sector electrodes may be provided in the astigmatic region and/or the ordinary region.

According to an embodiment of the present disclosure, in order to achieve astigmatism compensation, as shown in FIG. 9A, the electrode structure 40 includes two or more sector regions, for example, may be divided into two, four, six, or eight sector regions. As the number of the sector regions increases, the astigmatic diopter which is caused by focusing defect of a human eye at a specific optical axis position may be compensated more finely.

Figure 11:
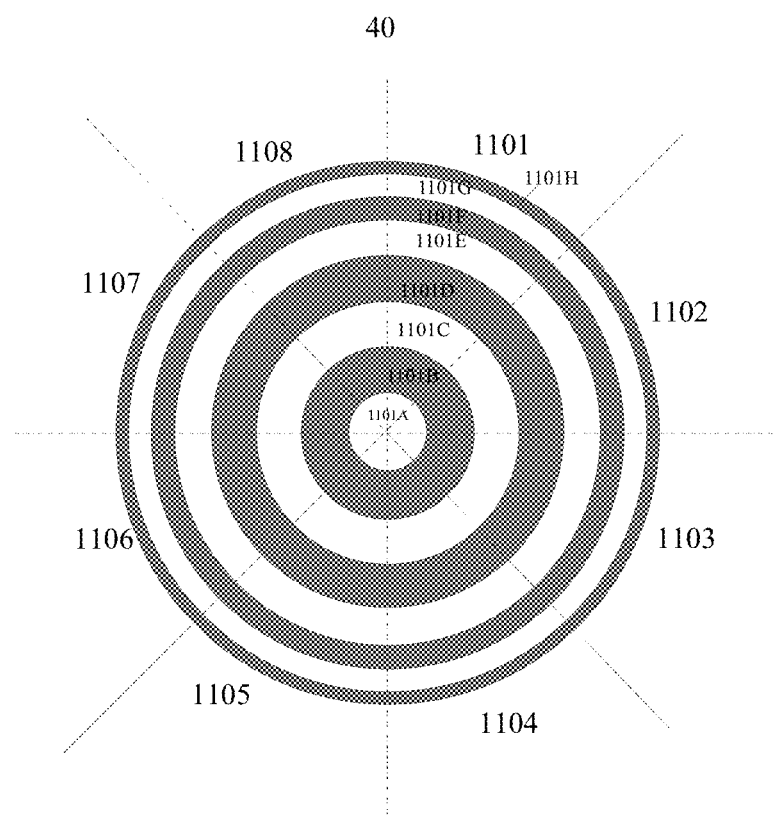
FIG. 11 is a schematic view of annular sector electrodes of a liquid crystal lens according to an embodiment of the present disclosure.

Alternatively, as shown in FIG. 11, the electrode structure 40 may include sector regions 1101~1108. For example, in FIG. 11, each of the sector regions 1101~1108 is provided with eight annular sector electrodes. For example, an annular sector electrode 1101A, an annular sector electrode 1101B, an annular sector electrode 1101C, an annular sector electrode 1101D, an annular sector electrode 1101E, an annular sector electrode 1101F, an annular sector electrode 1101G and an annular sector electrode 1101H are disposed in the sector region 1101. That is to say, the sector regions 1101~1108 are provided with the same quantity of the annular sector electrodes.

When it is desired to achieve astigmatism compensation, it is possible to control the quantity of driven annular sector electrodes in at least one sector region corresponding to the astigmatic region to be larger than the quantity of driven annular sector electrodes in the other sector regions. For example, when the position of the sector region 1101 corresponds to the specific optical axis position of the wearer's eye (e.g., the wearer's eye is astigmatic at the specific optical axis position), the eight annular sector electrodes in the sector region 1101 may be controlled such that the liquid crystal molecules 31 corresponding to the respective annular sector electrodes in the sector region 1101 are deflected to form four diffraction units in the astigmatic region, each of the four diffraction units including an opaque annular sector region and a transparent annular sector region; and the eight annular sector electrodes in each of the other sector regions 1102~1108 may be controlled such that the liquid crystal molecules 31 corresponding to the respective annular sector electrodes in each of the sector regions 1102~1108 are deflected to form two diffraction units in the ordinary region, each of the two diffractive units including an opaque annular sector region and a transparent annular sector region.

In this embodiment, the electrode structure 40 is also controlled such that the density of the Fresnel annuli caused by the annular sector electrodes in the at least one sector region is larger than the density of the Fresnel annuli caused by the annular sector electrodes in each of the other sector regions when the astigmatism compensation is required. In this way, the focal length of the Fresnel sector formed in the astigmatic region is smaller than the focal length of the Fresnel sector formed in the ordinary region to compensate for the astigmatic diopter which is caused by focusing defect of the wearer's eye at the specific optical axis position. As a result, the liquid crystal lens according to the embodiment of the present disclosure may correct astigmatism.

In the electrode structure according to an embodiment of the present disclosure, the annular sector electrodes may be disposed in the same layer or in different layers. In order to avoid crosstalk between adjacent electrodes, the annular sector electrodes of the electrode structure may be arranged in two layers, for example, the annular sector electrodes of the electrode structure are arranged in a concentric and spaced manner, and any two adjacent annular sector electrodes 410 are disposed in different layers, that is, the annular sector electrodes 410 of the electrode structure 40 are alternately disposed in the upper and lower layers, as shown in FIGS. 7 and 8.

In the electrode structure according to an embodiment of the present disclosure, the annular sector electrode may be made of ITO (Indium Tin Oxide), that is, the annular sector electrode of the electrode structure 40 may be an ITO electrode. Further, in the liquid crystal lens according to the embodiment of the present disclosure, the common electrode 50 may entirely be in planar shape.

Figure 12:
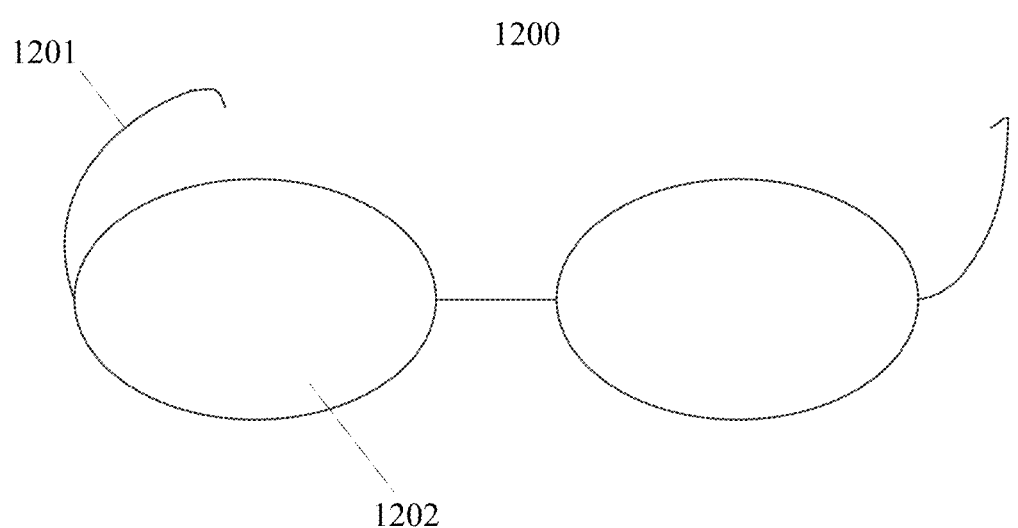
FIG. 12 is a schematic view of liquid crystal glasses according to an embodiment of the present disclosure.

According to an embodiment of the present disclosure, a pair of liquid crystal glasses is further provided. As shown in FIG. 12, the liquid crystal glasses 1200 may include a frame 1201 and liquid crystal lenses 1202. The liquid crystal lenses 1202 may be liquid crystal lenses according to any one of the above embodiments. For example, the liquid crystal glasses 1200 may include two liquid crystal lenses 1202 disposed on the frame 1201, and at least one of the two liquid crystal lenses 1202 may be a liquid crystal lens according to any one of the above embodiments.

Optionally, the liquid crystal glasses 1200 may further include, for example, a sensor and a controller. The sensor may include a plurality of distance sensors, each of which is connected to the controller for detecting a distance between the distance sensor and an eyeball of the wearer of the liquid crystal glasses and sending the detected distance to the controller. The controller is configured to convert the detected distance into a focal length of the human eye and calculate different voltages applied to the respective annular sector electrodes of the electrode structure of the corresponding liquid crystal lens according to the focal length of the human eye, thereby adjusting a focal length of the equivalent Fresnel lens which is produced by the deflections of the liquid crystal molecules in the liquid crystal layer when the respective annular sector electrodes are driven.

According to an embodiment of the present disclosure, when it detects that the eye of the wearer of the liquid crystal glasses is astigmatic, the position of the astigmatic region may be set to correspond to the specific optical axis position of the wearer's eye and the positions of the ordinary regions may be set to correspond to the other positions of the wearer's eye, so that the astigmatic diopter which is caused by focusing defect of the human eye at the specific optical axis position may be compensated.

According to an embodiment of the present disclosure, a method of controlling a liquid crystal lens is also provided. As shown in FIG. 13, the method may include the following steps:

controlling voltages applied to at least two first annular sector electrodes in a first sector region to control liquid crystal molecules in a liquid crystal layer corresponding to the first sector region to produce a first deflection, so as to configure the liquid crystal molecules in the liquid crystal layer corresponding to the first sector region as a first Fresnel element; and controlling voltages applied to at least two second annular sector electrodes in a second sector region to control liquid crystal molecules in the liquid crystal layer corresponding to the second sector region to produce a second deflection, so as to configure the liquid crystal molecules in the liquid crystal layer corresponding to the second sector region as a second Fresnel element.

Optionally, the second Fresnel element is different from the first Fresnel element.

For example, the first Fresnel element may have a first focal length and the second Fresnel element may have a second focal length, and the first focal length is less than the second focal length.

For example, the first Fresnel element includes M units, each of which includes a light-transmissive annulus and an opaque annulus, and the second Fresnel element includes N units, each of which includes a light-transmissive annulus and an opaque annulus, where M and N are natural numbers and M is greater than N.

In the liquid crystal lens, the method of controlling the liquid crystal lens and the liquid crystal glasses according to the embodiments of the present disclosure, the electrode structure is arranged in annular sector shape based on an optical design concept of the Fresnel zone plate, and different voltages are applied to electrodes of the electrode structure at different positions to control the liquid crystal molecules in regions of the liquid crystal layer corresponding to the electrodes to produce different deflections, so as to obtain the multi-level distribution of the equivalent optical path length, so that the liquid crystal molecules in the liquid crystal layer are equivalent to the Fresnel element with adjustable focal length. Moreover, in the liquid crystal lens, the method of controlling the liquid crystal lens and the liquid crystal glasses according to the embodiments of the present disclosure, the electrode structure arranged in annular sector shape is divided into a plurality of sector regions, and the density of the Fresnel annuli caused by the driven annular sector electrodes in the particular sector region is greater than the density of the Fresnel annuli caused by the driven annular sector electrodes in the other sector regions. In this way, the astigmatism diopter which is caused by focusing defect of the human eye at the specific optical axis position may be compensated. Therefore, the liquid crystal lens, the method of controlling the liquid crystal lens and the liquid crystal glasses according to the embodiments of the present disclosure may achieve compensation for astigmatism at the particular position while achieving a focal length adjustment.

Although some embodiments of the present disclosure have been shown and described, it is to be appreciated by those skilled in the art that these embodiments may be modified without departing from the spirit and principle of the present disclosure, and the scope of the present disclosure is defined by the claims and their equivalents.

What is claimed is:

1. A liquid crystal lens comprising:
a liquid crystal layer; and
an electrode structure, the electrode structure comprising:
    a first sector region;
    a second sector region;
        at least two first annular sector electrodes in the first sector region; and
        at least two second annular sector electrodes in the second sector region,
    wherein the electrode structure is configured to:
        in response to voltages applied to the at least two first annular sector electrodes, control liquid crystal molecules in the liquid crystal layer corresponding to the first sector region to generate a first deflection so as to configure the liquid crystal molecules in the liquid crystal layer corresponding to the first sector region as a first Fresnel element; and
        in response to voltages applied to the at least two second annular sector electrodes, control liquid crystal molecules in the liquid crystal layer corresponding to the second sector region to generate a second deflection so as to configure the liquid crystal molecules in the liquid crystal layer corresponding to the second sector region as a second Fresnel element, the second Fresnel element being different from the first Fresnel element,
    wherein the first Fresnel element comprises M units, each of the M units comprising a light-transmissive annulus and an opaque annulus, and the second Fresnel element comprises N units, each of the N units comprising a light-transmissive annulus and an opaque annulus, wherein M and N are natural numbers and M is greater than N.

2. The liquid crystal lens according to claim 1, wherein the first Fresnel element has a first focal length, the second Fresnel element has a second focal length, and the first focal length is smaller than the second focal length.

3. The liquid crystal lens according to claim 1, wherein a quantity of the first annular sector electrodes is greater than a quantity of the second annular sector electrodes.

4. The liquid crystal lens according to claim 1, wherein a quantity of the first annular sector electrodes is equal to a quantity of the second annular sector electrodes.

5. The liquid crystal lens according to claim 1, wherein the at least two first annular sector electrodes are arranged concentrically in the first sector region in a radial direction of the first sector region; and/or
    the at least two second annular sector electrodes are arranged concentrically in the second sector region in a radial direction of the second sector region.

6. The liquid crystal lens according to claim 5, wherein a distribution density of the at least two first annular sector electrodes in the radial direction of the first sector region is greater than a distribution density of the at least two second annular sector electrodes in the radial direction of the second sector region.

7. The liquid crystal lens according to claim 5, wherein widths of the at least two first annular sector electrodes in the radial direction of the first sector region gradually decrease in a radially outward direction of the first sector region; and/or widths of the at least two second annular sector electrodes in the radial direction of the second sector region gradually decrease in a radially outward direction of the second sector region.

8. The liquid crystal lens according to claim 7, wherein the electrode structure comprises at least six second sector regions.

9. The liquid crystal lens according to claim 1, wherein the electrode structure comprises at least two first sector regions.

10. The liquid crystal lens according to claim 1, wherein the electrode structure comprises at least two second sector regions.

11. The liquid crystal lens according to claim 1, wherein the at least two first annular sector electrodes are arranged in two layers respectively, and any two adjacent ones of the at least two first annular sector electrodes are alternately arranged in the two layers; and/or the at least two second annular sector electrodes are arranged in two layers respectively, and any two adjacent ones of the at least two second annular sector electrodes are alternately arranged in the two layers.

12. The liquid crystal lens according to claim 1, wherein each of the first Fresnel element and the second Fresnel element has an equivalent optical path length, the equivalent optical path length having two levels, four levels, six levels or eight levels.

13. The liquid crystal lens according to claim 1, further comprising: a first substrate and a second substrate opposite to each other; and a common electrode, wherein the liquid crystal layer is disposed between the first substrate and the second substrate, the electrode structure is disposed on a side of the first substrate facing towards the liquid crystal layer, and the common electrode is disposed on a side of the second substrate facing towards the liquid crystal layer.

14. The liquid crystal lens according to claim 13, wherein the common electrode comprises a planar electrode.

15. Liquid crystal glasses comprising:

a frame; and two liquid crystal lenses on the frame, wherein at least one of the two liquid crystal lenses is the liquid crystal lens according to claim 1.

16. A method of controlling a liquid crystal lens, the liquid crystal lens comprising a liquid crystal layer and an electrode structure, the electrode structure comprising: a first sector region; a second sector region; at least two first annular sector electrodes in the first sector region; and at least two second annular sector electrodes in the second sector region, the method comprising:

controlling voltages applied to the at least two first annular sector electrodes to control liquid crystal molecules in the liquid crystal layer corresponding to the first sector region to produce a first deflection, so as to configure the liquid crystal molecules in the liquid crystal layer corresponding to the first sector region as a first Fresnel element; and controlling voltages applied to the at least two second annular sector electrodes to control liquid crystal molecules in the liquid crystal layer corresponding to the second sector region to produce a second deflection, so as to configure the liquid crystal molecules in the liquid crystal layer corresponding to the second sector region as a second Fresnel element, wherein the second Fresnel element is different from the first Fresnel element, wherein the first Fresnel element comprises M units, each of the M units comprising a light-transmissive annulus and an opaque annulus, and the second Fresnel element comprises N units, each of the N units comprising a light-transmissive annulus and an opaque annulus, wherein M and N are natural numbers and M is greater than N.

17. The method according to claim 16, wherein the first Fresnel element has a first focal length, the second Fresnel element has a second focal length, and the first focal length is smaller than the second focal length.

* * * * *